United States Patent

[11] 3,614,469

[72] Inventor John D. Heightley
Basking Ridge, N.J.
[21] Appl. No. 844,752
[22] Filed July 25, 1969
[45] Patented Oct. 19, 1971
[73] Assignee Bell Telephone Laboratories, Incorporated
Murray Hill, N.J.

[54] SHIFT REGISTER EMPLOYING TWO-PHASE COUPLING AND TRANSIENT STORAGE BETWEEN STAGES
12 Claims, 2 Drawing Figs.

[52] U.S. Cl. .......... 307/221 R, 307/224 R, 307/238, 307/247, 307/292
[51] Int. Cl. .......... H03k 23/08
[50] Field of Search .......... 307/221, 224, 238, 247, 259, 292

[56] References Cited
UNITED STATES PATENTS

| | | | |
|---|---|---|---|
| 2,912,596 | 11/1959 | Huang | 307/221 |
| 2,923,839 | 2/1960 | Meyers | 307/221 |
| 3,268,740 | 8/1966 | Rywak | 307/221 X |
| 3,297,950 | 1/1967 | Lee III | 307/221 X |
| 3,508,212 | 4/1970 | Ault | 307/224 X |

*Primary Examiner*—Stanley D. Miller, Jr.
*Attorneys*—R. J. Guenther and Arthur J. Torsiglieri

ABSTRACT: In shift registers there is generally provided an intermediate storage function between stages to enable each stage to transfer its information prior to accepting the next incoming signal, i.e., to avoid a race condition. In accordance with this invention there is provided between each stage a coupling circuit comprising in series a Schottky-barrier (SB) diode, an emitter-follower transistor, and a second diode. While the stages are in the holding mode, the state of stage N is coupled through the SB diode, stored on the capacitance at the base of the emitter-follower, and isolated from stage N+1 by the second diode. Upon application of a shift signal, the SB diode immediately turns off and thereby isolates the Nth stage from the emitter-follower. The second diode turns on; and the signal which was stored at the base of the emitter-follower is coupled through the second diode to set the state of stage N+1.

INVENTOR
J. D. HEIGHTLEY
BY Arthur J. Torsiglieri
ATTORNEY

SHIFT REGISTER EMPLOYING TWO-PHASE COUPLING AND TRANSIENT STORAGE BETWEEN STAGES

BACKGROUND OF THE INVENTION

1. Field of the Invention

This invention relates to serial digital data storage apparatus. For simplicity and clarity, my invention will be described primarily as embodied in a dual-rail shift register, although it will be understood my invention is of equal applicability in other forms of serial digital storage, e.g., counters and adders.

2. Description of the Prior Art

Shift registers generally include a plurality of identical, cascaded, single-bit storage stages interconnected so that each stage assumes the state of the preceding stage upon command of a shift signal. Broadly, each stage comprises a bistable storage element, e.g., a flip-flop, and a signal coupling element. The coupling element includes an intermediate storage portion which is necessary to enable each stage to transfer its information prior to accepting an incoming signal, i.e., to avoid what in the art is termed a "race" condition.

Commonly, in the prior art each stage of a shift register includes two flip-flops, one for suitable storage, and one for coupling. Upon application of a shift pulse, the digital state of each storage flip-flop is shifted into the coupling associated therewith. Upon removal of the shift pulse, the contents of each coupling flip-flop are shifted into the storage flip-flop of the next succeeding stage. Because these two distinct shifts both occur during the transient shifting period, this form of shift register inherently is slower than necessary.

Other forms of coupling have also been proposed. The use of capacitors and diodes for coupling is disclosed in U.S. Pat. No. 3,316,426 to I. Imahashi. The use of a zener is disclosed in U.S. Pat. No. 3,198,960 to J. F. Kruy. Unfortunately, both require circuit components which are not easily provided in semiconductor integrated circuit embodiments.

SUMMARY OF THE INVENTION

An object of this invention is an improved serial digital storage arrangement which can be embodied easily as a semiconductor integrated circuit.

A further object of this invention is a serial digital storage arrangement which can be operated at high speed with low power dissipation.

To these and other ends, I have invented an improved digital storage arrangement characterized by improved signal coupling means.

In a broad aspect, the coupling means in accordance with my invention comprises in series a fast recovery diode, a charge storage device, and a second diode. Each shift register includes a bistable storage portion and at least one such coupling means.

During the quiescent, or holding, mode of the shift register signal corresponding to the state of the bistable storage portion is coupled through the fast recovery diode and temporarily stored in the charge storage device in the coupling means. During this period the second diode is maintained nonconducting. Hence, the information content of the charge storage device is isolated from the bistable portion of the nest succeeding stage.

Upon application of a shift pulse to the shift register, the fast recovery diode becomes nonconducting and the information content of the charge storage device is coupled through the second diode to the input of the bistable portion of the next succeeding stage. It will be appreciated that in a broad sense my invention is characterized by two phase shifting of information, one of which phases of shifting occurs during the holding mode, i.e., through the fast recovery diode and into the charge storage device of the coupling means. Inasmuch as one of the phases of shifting occurs during the holding mode, a shift register in accordance with my invention inherently is faster in operation than the prior art circuits in which both shifting phases occur during the shift mode.

More particularly now, in accordance with a first embodiment of my invention each shift register stage includes a bistable storage portion, e.g., a flip-flop, and a signal-coupling portion. The coupling portion comprises in series a fast recovery diode (FRD), and emitter-follower transistor circuit for providing the intermediate storage, and a second diode. One electrode of the FRD is coupled to an output of the flip-flop, and the other electrode of the FRD is coupled to the base electrode of the transistor. One electrode of the second diode is coupled to an output electrode of the transistor, e.g., emitter or collector, and the other electrode of the second diode is coupled to an input of the flip-flop of the next succeeding stage.

In operation, the digital state of a given stage is stored and evidenced by the conductive condition of the bistable storage portion of that stage. While the stages are in the holding mode, a signal corresponding to the state of the bistable storage portion of each stage is coupled through the fast recovery diode to the emitter-follower portion of the coupling circuit associated with that stage. This signal establishes a particular level of conduction in the transistor of the emitter-follower circuit; and in this manner, the state of the bistable storage portion is temporarily stored in duplicate on the capacitance associated with the base of the transistor in the emitter-follower circuit.

During the holding mode, the voltage over second diode (which couples the emitter-follower to the input of the next stage) is maintained so that this second diode is in the nonconducting state. In this manner, the emitter-follower is isolated from that next stage until the application of a shift pulse.

To shift information from one stage to the next, a shift pulse is applied to the bistable storage portion of each stage. Upon application of the shift pulse, the fast recovery diode of each stage immediately turns off and isolates the storage portion of each stage from the emitter-follower of the coupling portion of that stage while the level of conduction in the emitter-follower is maintained. As the fast recovery diode turns off, the second diode turns on and couples the signal evidenced by the level of conduction of the emitter-follower transistor to the input of the storage portion of the next stage. Upon removal of the shift pulse, all stages return to the holding mode, at which time each stage has assumed the state of the next preceding stage and a signal corresponding to its new state is coupled through the FRD to the base of the emitter-follower.

As will be described in more detail hereinbelow, power dissipation of these circuits is reduced with respect to prior art circuits and can be reduced further by appropriate gating of the emitter-follower circuits.

BRIEF DESCRIPTION OF THE DRAWING

The invention will be better understood from the following more detailed description taken in conjunction with the accompanying drawing, in which.

In each figure, the second stage is in all respects identical to the first stage; and elements in the second stage are denoted by the same reference numeral as the corresponding element of the first stage, but with a suffix A attached.

DETAILED DESCRIPTION

Figure 1:
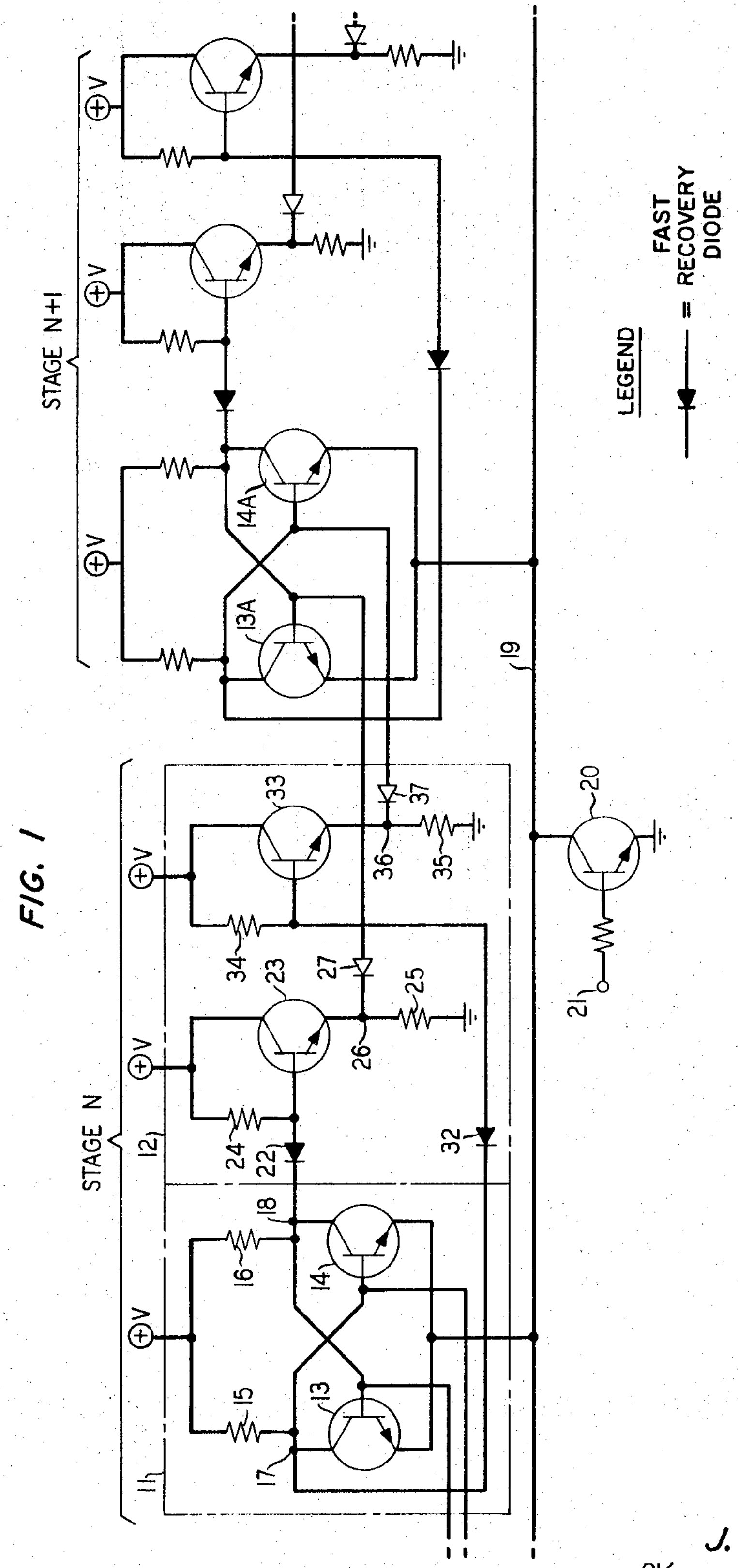
FIG. 1 shows a schematic circuit diagram of two successive stages of a shift register in accordance with a first embodiment of this invention.

With reference now to the drawing, in FIG. 1 are shown two identical stages, N and N+, intermediate in a cascade of stages forming a dual-rail shift register. Each stage comprises a binary storage portion (within broken-line rectangle 11) and a signal coupling portion (within broken-line rectangle 12).

Although other forms of bistable circuits or circuit elements can be used, storage portion 11 is shown for illustration as a simple flip-flop comprising cross-coupled, matched transistors 13 and 14 connected through load resistors 15 and 16 to a source (+V) of positive voltage. The emitter electrodes of transistors 13 and 14 are connected together and to a control line 19 which is common to all the stages. The collector electrode of transistor 13 is connected to the base electrode of transistor 14 and to an output node 17. The collector electrode of transistor 14 is connected to the base electrode of transistor 13 to an output node 18.

The stages are maintained in the holding mode by clamping control 19 at or near to ground voltage through a low impedance, e.g., a saturated transistor. A transistor 20, having its collector electrode connected to control line 19 and its emitter electrode connected to ground is shown to illustrate one possible means for so clamping control line 19.

Transistor 20 normally is maintained in the saturated mode by the application of a positive voltage, e.g., 0.8 volt, to terminal 21. In this condition the emitter electrodes of flip-flop transistors 13 and 14 are connected through a low impedance to ground and storage portion 11 is maintained in the latched or holding mode.

signal-coupling portion 12 comprises two matched parts, each of which parts couples a signal from an output node in storage portion 11 of stage N to an input node of the storage portion of stage N+1. Each part includes in series a fast recovery diode 22(32), an emitter-follower transistor 23 (33), and second diode 27 (37). Resistors 24 and 25 provide bias for transistor 23 and resistors 34 and 35 provide bias for transistor 33. Advantageously, corresponding components in the two parts are matched.

With storage portion 11 in the holding mode, the operation of coupling portion 12 is as follows. Because of the bias provided by source (+V) in combination with resistors 24, 25, 34 and 35, emitter-follower transistors 23 and 33 are conducting at some level. The levels of conduction in transistors 23 and 33 depend upon the voltage at nodes 18 and 17, respectively, less the voltage drops through coupling diodes 22 and 32, respectively.

Inasmuch as storage portion 11 is in the holding mode, either transistor 13 is on and the transistor 14 is off or transistor 14 is on and transistor 13 is off. Assume, for example, transistor 13 is on and transistor 14 is off. In this condition the voltage at node 17 is about 0.5 volt (two saturated collector voltages above ground), and the voltage at node 18 is about 1.0 volt (one saturated collector voltage plus one base-emitter voltage above ground).

Since node 18 is at a higher voltage than 17, and since the voltages across diodes 22 and 32 are nearly equal, transistor 23 is at a higher level of conduction than is transistor 33 because the voltage on the base of transistor 23 is higher, Accordingly, node 26 is at a higher voltage than is node 36 since the emitter-base voltages of transistors 23 and 33 are nearly equal.

It will be remembered that stage N+1 is identical to stage N and is also in the holding mode. Accordingly, the most positive potential which can be present at the input nodes (base electrodes of transistors 13A and 14A) is about 1.0 volt. Also, considering diode drops in the respective paths, the most negative potential which can be present at nodes 26 and 36 is about 0.4 volt. Thus, if diodes 27 and 27 are selected to have a turn-on voltage of greater than about 0.6 volt, e.g., silicon PN junction, the signal level at nodes 26 and 36 is isolated from the input nodes of stage N+1 during the holding mode.

To shift information, transistor 20 is turned off, thus presenting a very high impedance to the emitters of the flip-flop transistors. This causes the voltages at the collectors (nodes 17 and 18) of the flip-flop transistors to begin to increase. If the time constants of the circuitry attached to the anode sides of fast recovery diodes 22 and 32 are greater than the time constants of the circuitry attached to the cathode sides of those diodes, they become reverse-biased and this isolate storage portion 11 form the emitter-followers 23 and 33. Because of the large time constants associated with the base node of the emitter-followers, these transistors continue to conduct at their respective different levels. As the collector voltages of flip-flop transistors 13A and 14A continue to rise, these collectors, and the base electrodes attached thereto, are clamped at different voltage levels through diodes 27 and 37, as determined by the digital state evidenced at nodes 26 and 36.

Then, as the shift pulse is removed, i.e., transistor 20 is turned back on, the flip-flop of stage N+1 settles back into the holding mode with the state which was previously stored in stage N. Of course, the state of stage N−1 has also been shifted into stage N, etc.

As the shift register settles back into the holding mode, diodes 22 and 32 again conduct, diodes 27 and 37 become nonconducting, and the new state of stage N is coupled to and is duplicately evidenced by the level of conduction of transistors 23 and 33 until another shift pulse is applied to turn off transistor 20.

Diodes 22 and 32 have been referred to hereinabove as "-fast recovery diodes." "Fast recovery" is a term commonly used in the art to refer to semiconductor devices which operate with a relatively very small amount of stored minority carriers, and so can be switched from a conducting state to a nonconducting state relatively quickly and easily. Schottky-barrier diodes of the type compatible with planar semiconductor integrated circuit technologies are particularly advantageous for fast recovery diode use since they incur only negligible minority carrier storage when conducting in the forward direction.

Another characteristic of Schottky-barrier diodes which renders them particularly advantageous for use as diodes 22 and 32 in the coupling circuit is that the procedure for fabricating them easily is adjusted to vary the amount of voltage required to bias them to a state of full forward conduction. This characteristic is advantageous in that it enables a facile adjustment of the minimum potential which can appear at emitter-follower nodes 26 and 36 in the coupling circuit and so enables a facile control over noise-margins relevant to diodes 27 and 37.

Of prime importance to the practice of this invention are the time constants of the circuitry attached to the fast recovery diodes. As mentioned hereinabove, the time constants on the anode side of the fast recovery diodes are larger than the time constants on the cathode side. In the embodiment of FIG. 1, this can be accomplished only by making the resistance-capacitance (RC) product of resistor 24 (34) and the collector-base capacitance of emitter-follower transistor 23 (33) larger than the RC product of the load impedance and the transistor capacitances in the flip-flop. For some applications, e.g., semiconductor integrated circuits, the size of matched load resistors 15 and 16 advantageously is made as large as practical to minimize power dissipation. Thus, for these applications, making resistor 24 (34) much larger for time constant purposes becomes a design problem. Also, an extremely large resistor 24 (34) is not optimum during the time in which the shift register is settling back into the holding mode because it increases the amount of time required to settle back into the steady state holding levels.

Figure 2:
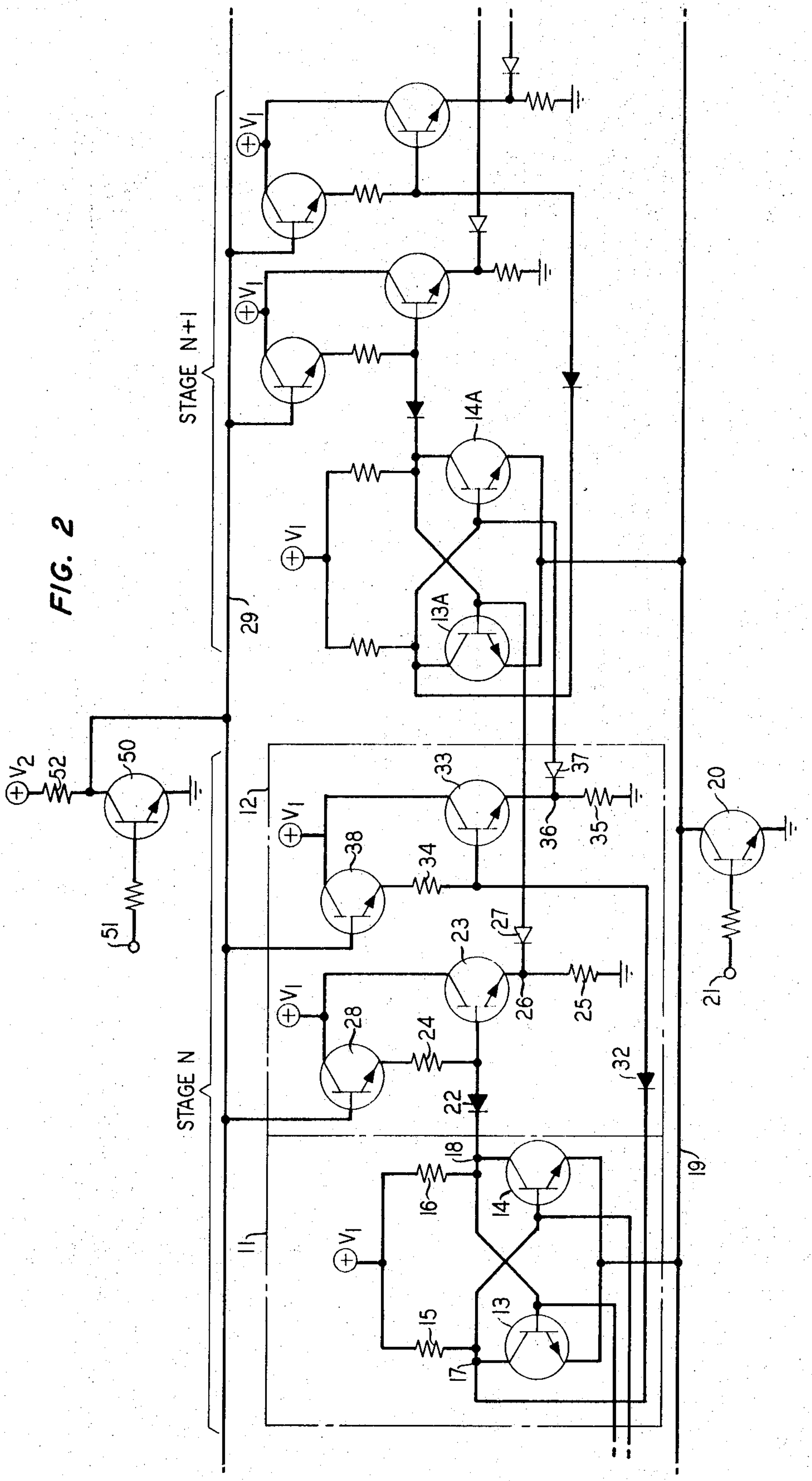
FIG. 2 shows a schematic circuit diagram of two successive stages of the shift register in accordance with a second embodiment of this invention.

For these and other applications, the embodiment shown in FIG. 2, having a switchable, active impedance in the coupling portion of each stage may be advantageous. FIg. 2 shows two identical stages, N and N+1, intermediate in a cascade of identical stages forming a dual-rail shift register in accordance with a second embodiment of this invention. As in the first embodiment, shown in FIG. 1, each stage comprises a binary storage portion (within broken-line rectangle 11) and a signal coupling portion (within broken-line rectangle 12). It will be noted the same reference numerals have been used for corresponding circuit elements in FIGS. 1 and 2.

In FIG. 2, storage portion 11 comprises for illustration a simple flip-flop, as in FIG. 1. Also as in FIG. 1, coupling portion 12 in FIG. 2 comprises two identical parts, each of which parts couples a signal from an output node in storage portion 11 of stage N to an input node of stage N+1. Each part includes in series a fast recovery diode 22 (32), an emitter-follower transistor 23 (33), and second diode 27 (37).

The coupling portion of FIG. 2 differs from that of FIG. 1 in that FIG. 2, the biasing impedance for the base circuit of each emitter-follower transistor includes the collector-emitter circuit of a transistor in series with a resistor. More specifically, the biasing impedance for the base circuit of transistor 23 includes transistor 28 having its collector-emitter circuit in series with resistor 24; and the biasing impedance for the base circuit of transistor 33 includes transistor 38 similarly in series with resistor 34.

The base electrodes of transistors 28 and 38 are connected to a common control line 29 which normally is maintained at a positive sufficient to render transistors 28 and 38 conductive while the shift register is in the holding mode.

Control line 29 may be driven by any variety of well-known techniques. For simplicity of illustration, a transistor 50 having its emitter electrode connected to ground and its collector connected through an impedance 52 to a source of potential ($+V_2$) may be considered to drive line 29 from its collector electrode. When input terminal 51 is sufficiently positive to turn transistor 50 on, control line 29 is held near ground voltage and transistors 28 and 38 thereby are rendered nonconducting. When input terminal 51 is maintained at a potential which turns transistor 50 off, control line 29 is maintained sufficiently positive to render transistors 28 and 38 conducting.

In operation, the shift register normally is maintained in the holding mode by maintaining transistor 20 on. Transistor 50 is off and transistors 28 and 38 are on. In this mode, signals corresponding to the state of storage portion 11 are coupled from output nodes 17 and 18 through fast recovery diodes 22 and 32 and evidenced by the level of conduction of emitter-follower transistors 23 and 33, respectively.

Optimally, just before a shift pulse turns off transistor 20 a pulse is applied to terminal 51 to turn on transistor 50. This turns off transistors 28 and 38 so that a high impedance is presented to the base electrodes of transistors 23 and 33 during the shifting mode. Then a shift pulse is applied to turn off transistor 20; and the shifting proceeds much as described with reference to FIG. 1.

The voltages on nodes 17 and 18 rise and the fast recovery diodes 22 and 32 become reverse-biased. Because diodes 22 and 32 and transistors 28 and 38 are off, the collector-base capacitances of emitter-follower transistors 23 and 33 can discharge only through the impedance reflected through the base-emitter junctions of transistors 23 and 33. This impedance, of course, is approximately the impedance of resistors 24 and 25, respectively, multiplied by the current gain ($h_{fe}$) of transistors 23 and 33. This impedance can be made relatively very high; and, accordingly, the amount of time available for coupling the signals from nodes 26 and 36 through diodes 27 and 37 to the input nodes of stage N+1 can be made relatively very long.

As with the circuit of FIG. 1, the shifting mode is terminated by terminating the shift pulse, thus turning on transistor 20. Optimally transistor 50 is turned off so as to turn transistors 28 and 38 on just after transistor 20 is turned on. In this sequence the currents supplied by transistors 28 and 38 do not deleteriously affect the shifting process but are available in time to supply current to transistors 23 and 33 to speed up the process of settling into the holding mode.

It is to be understood that the embodiments described in detail are merely illustrative of the general principles of the invention. Various modifications will be apparent to a worker in the art without departing from the spirit and scope of the invention.

For example, an impedance can be disposed in the collector circuit of emitter-follower transistors 23 and 33 so that those transistors can become saturated. In this manner those transistors will provide additional charge storage in the form of stored minority carriers in the base and collector regions. This is desirable in that generally the duration of the digital signal supplied through the second diodes 27 and 37 to the next stage during the shifting mode is proportional to the amount of charge storage associated with the base electrodes of the emitter-follower transistors during the holding mode.

Further, to minimize power dissipation, gateable impedances can be disposed in series with or substituted for emitter resistors 25 and 35. For example, the collector-emitter circuit of a transistor can be used in a fashion similar to the use of transistors 28 and 38 in FIG. 2. These emitter series impedances can be switched to a state of relatively very high impedance during the holding mode and to a relatively lower impedance during the shifting mode. Depending upon the ratio of the amount of time spent in the holding mode to the amount of time spent in the shifting mode (duty cycle), this can result in a significant reduction in power consumption with slight or no decrease in performance.

Still further, to increase speed of operation, the base-collector junctions of the flip-flop transistors (13 and 14) and the driving transistors (20 and 50) can be shunted with diodes, e.g., Schottky-barrier diodes, to control saturation, as described in the copending application Ser. No. 683.238. filed Nov. 25, 1967.

Still further, the circuits described can be modified to operate in the unbalanced or single-rail manner in accordance with techniques well known in the art. More particularly, in this case, only one side (node 17 or 18) of each bistable storage portion (11) of one stage is coupled to a corresponding one side of the storage portion of the next stage. The other side of each bistable portion is biased to a voltage midway in the signal swing so that each bistable portion will automatically assume a predetermined digital state in the absence of a driving signal to the contrary.

Still further, it will be apparent the circuits described can be modified in accordance with techniques well known in the art to enable shifting both left and right in either dual-rail or single-rail fashion.

Still further, it will be apparent other devices may be substituted for the diodes (22, 32, 27, and 37) in the coupling circuit. Basically, there is required an asymmetrically conducting device with an appropriate threshold of conduction in the "easy" or forward direction.

And finally, of course the NPN transistors illustrated can be replaced by PNP transistors provided the relevant voltages and diode polarities are reversed. Similarly, the NPN transistors can be replaced by field effect transistors.

I claim:

1. A serial digital storage arrangement comprising a plurality of cascaded stages wherein a stage comprises:
a bistable storage element; and
a coupling element;
said coupling element including in series:
a fast recovery first diode having at least two electrodes, one of which electrodes is coupled to a output node of the bistable storage element;
a transistor coupled to the other electrode of the first diode; and
a second diode having at least two electrodes, one of which is coupled to the transistor and the other of which is coupled to an output node of the bistable storage element of the next succeeding stage.

2. A serial digital storage arrangement comprising a plurality of cascaded stage wherein each stage comprises:
a bistable storage element having an input node and an output node; and
coupling means including a series circuits comprising:
a fast recovery diode having at least two electrodes, one of which is coupled to the output node of the bistable storage element;
storage means which are not bistable for temporarily storing a signal representative of the digital state of the bistable storage element, said storage means being coupled to the other electrode of the fast recovery diode; and a second diode coupled between the storage means and the input node of the bistable storage elements of the next succeeding stage;

means forming a conduction path coupled to the bistable storage element of each stage; and means for switching the potential on said conduction path to the first level for forcing the storage arrangement into a holding mode during which the fast recovery diodes are turned on and the second diodes are turned off and during which in each stage a digital stage is stored in duplicate in the bistable storage element and the temporary storage means of that Stage, and for switching the potential on said conduction path to a second level for forcing the storage arrangement into a shifting mode during which the fast recovery diodes are turned off and the second diodes are turned on and during which information is transferred through the second diodes from the temporary storage means of each stage to the bistable storage element of the next succeeding stage;

the apparatus being arranged so that in each stage the time constants of the circuitry attached to said one electrode of the fast recovery diode are smaller than the time constant of the storage means so that when the potential on said conduction path is switched from the second level to the first level for causing the storage arrangement to switch into the shifting mode from the holding mode, the fast recovery diode is switched to a reverse-biased state before the stored digital state is conducted through the second diode to the next succeeding stage.

3. Apparatus as recited in claim 2 wherein the temporary storage means is a transistor.

4. Apparatus as recited in claim 3 wherein the base electrode of the transistor is coupled to said other electrode of the fast recovery diode and the emitter electrode of the transistor is coupled to the second diode.

5. Apparatus as recited in claim 2 wherein the fast recovery diode is a Schottky-barrier diode.

6. Apparatus as recited in claim 2 wherein the temporary storage means includes gateable circuit means for presenting a relatively small time constant to said other electrode of the fast recovery diode while the storage arrangement is operating in the holding mode for presenting a relatively large time constant to said other electrode while the storage arrangement is operating in the shifting mode.

7. A shift register of the type comprising a plurality of cascaded stages;

wherein each stage comprises:

a bistable storage element having an input node and an output node; and coupling means including a series circuit comprising:

a fast recovery diode having at least two electrodes, one of which is coupled to the output node of the bistable storage element;

a transistor, the base electrode of which is coupled to the other electrode of the fast recover diode; and a second diode having at least two electrodes, one of which is coupled to an output electrode of the transistor, and the other of which is coupled to the input node of the bistable storage element in the next succeeding stage.

8. A shift register as recited in claim 7 further characterized in that the time constant of the circuitry attached to said one electrode of the fast recovery diode is smaller than the time constant of the circuitry attached to said other electrode of the fast recovery diode.

9. A shift register as recited in claim 7 wherein the fast recovery diode is a Schottky-barrier diode.

10. A shift register as recited in claim 7 in combination with means for causing the transistor to operate in the emitter-follower mode.

11. A shift register as recited in claim 7 in combination with an impedance in series with the emitter electrode of the transistor for causing the transistor to operate in the emitter-follower mode.

12. A shift register as recited in claim 7 wherein:

the bistable storage element of the stage includes a control node adapted for connection to a source of pulses for controlling the holding and shifting of data; and the transistor is connected in combination with gateable circuit means for presenting a relatively small time constant to said other electrode of the fast recovery diode while the flip-flop is operating in the holding mode and for presenting a relatively large time constant to that electrode while the flip-flop is operating in the shifting mode.